United States Patent [19]

Wannamaker et al.

[11] Patent Number: 5,141,335

[45] Date of Patent: Aug. 25, 1992

[54] THERMOCOUPLE CONNECTOR

[75] Inventors: David Wannamaker; Paul Poechman; Michael Baldock, all of Edmonton, Canada

[73] Assignee: Alltemp Sensors Inc., Edmonton, Canada

[21] Appl. No.: 670,174

[22] Filed: Mar. 15, 1991

[51] Int. Cl.$^5$ .................. G01K 07/06; G01K 01/12; H01L 35/02
[52] U.S. Cl. .................. 374/179; 374/165; 374/208; 136/232; 136/233
[58] Field of Search ............ 374/165, 179, 208, 209, 374/210; 136/229, 230, 232, 233

[56] References Cited

U.S. PATENT DOCUMENTS

| | | | |
|---|---|---|---|
| 2,207,647 | 7/1940 | Whipple | 374/179 X |
| 3,143,439 | 8/1964 | Hansen | 374/208 X |
| 3,874,239 | 4/1975 | Finney. | |
| 3,939,554 | 2/1976 | Finney. | |
| 4,043,200 | 8/1977 | Finney. | |
| 4,164,433 | 8/1979 | Granahan et al. | 374/179 X |
| 4,477,687 | 10/1984 | Finney | 374/179 X |
| 4,971,452 | 11/1990 | Finney | 374/208 |

FOREIGN PATENT DOCUMENTS 1012258  6/1977  Canada.
1016666  8/1977  Canada.

OTHER PUBLICATIONS

Drawing by ARi Industries Inc. dated in Apr. 1989 of "Fan Junction".
Page entitled "Better Furnace Tube Metal Temperature Thermocouple Identified", a report of an EEEL survey.

Primary Examiner—William A. Cuchlinski, Jr.
Assistant Examiner—G. Bradley Bennett
Attorney, Agent, or Firm—Anthony R. Lambert

[57] ABSTRACT

A thermocouple connector for measuring the temperature of a surface includes a heat conductive casing having a hollow interior and a linear ridge on one side. The apex of the linear ridge forms a contact zone with the surface. A pair of thermocouple leads extends into the hollow interior of the casing, and are attached to the casing at and parallel to the linear ridge. The contact zone is sufficiently wide in relation to the distance of the contact zone from the leads such that welds along the side of the contact zone penetrate the contact zone, but do not penetrate so far as to burn the leads.

2 Claims, 1 Drawing Sheet

THERMOCOUPLE CONNECTOR

FIELD OF THE INVENTION

This invention relates to connectors between thermocouples and the object whose temperature is being measured.

BACKGROUND AND SUMMARY OF THE INVENTION

It is desirable in many industries to monitor the temperature of operating equipment. Thus for example in the oil industry it is common to monitor the temperature of pipes in numerous applications. The temperature of such equipment is often monitored by using thermocouples. A thermocouple consists essentially of two wires or leads made of different metals and joined together at two junctions. A temperature difference between their ends results in the creation of a potential difference or voltage between them with resulting current flow, and this voltage can be measured. Since the relationship between the resulting voltage and the temperature difference is known, knowledge of the temperature of one end gives the temperature at the other end. For the application of this method, one junction of the two leads must be attached to the object whose temperature is being measured.

One early method of doing this, for the measurement of a pipe surface, was to weld the two lead junction of the thermocouple to a square pad that was welded directly onto the pipe. The two leads were attached parallel to the surface of the pipe and exposed to the environment. This design allowed the thermocouple leads to be affected by direct heat radiation, with the consequence that the thermocouple failed to respond properly to the heat of the pipe.

One simple solution to this difficulty has been to encase the thermocouple junction in a steel casing and thus insulate the junction from heat radiation. The two thermocouple leads, which were as usual in a plane parallel to the surface being measured, were bent near the junction so that the thermocouple leads contacted the casing at right angles to the pipe. This casing was then welded, at a flat part of the casing, to the surface of the pipe. The parts of the leads near the junction were thus insulated within the casing.

A further solution, described in U.S. Pat. No. 4,043,200, dated Aug. 23, 1977, describes a surface thermocouple assembly which includes a V-shaped pad for connection to a tube. A thermal conducting connection is formed between the knife-edge of the V-shaped pad and the tube.

The inventor has found that the prior art solutions do not achieve optimal temperature measurement. This is believed to be in part because the welding of the metal pad or the flat face of the casing to the surface of the pipe can leave air gaps between the metal pad or casing that distort the temperature measurement. In addition, the casing tends to draw heat because it includes excess metal. In the case of the knife-edged pad, welds may penetrate the pad and negatively affect the thermo-couple junction by melting the metal at the junction.

The inventor has also found a solution to these problems. The inventor has proposed a thermocouple connector comprising:
a heat conductive casing having a hollow interior;
insulating material within the hollow interior;
a pair of thermocouple leads extending into the hollow interior of the casing;
the casing having a linear ridge including a surface contact zone formed on one side;
the thermocouple leads being attached to the casing at and co-linear with the linear ridge; and
the contact zone being sufficiently wide in relation to the distance of the contact zone from the leads such that welds along the side of the contact zone penetrate the contact zone, but do not penetrate so far as to burn the leads.

By having at least two faces of the casing meeting to form an edge, and with the leads attached to the casing more or less at the edge and parallel to it, the edge may be welded to a pipe surface with no air gap between the edge and the pipe surface and thus provide good heat conductivity between the pipe and the junction of the thermocouple leads.

The linear ridge is preferably formed by a pair of faces meeting at the contact zone and forming an angle about 90–135 degrees, or even more preferably 115 degrees.

BRIEF DESCRIPTION OF THE DRAWINGS

There will now be described a preferred embodiment of the invention, with reference to the drawings, by way of illustration, in which like numerals denote like elements and in which.

DESCRIPTION OF PREFERRED EMBODIMENTS

Figure 1:
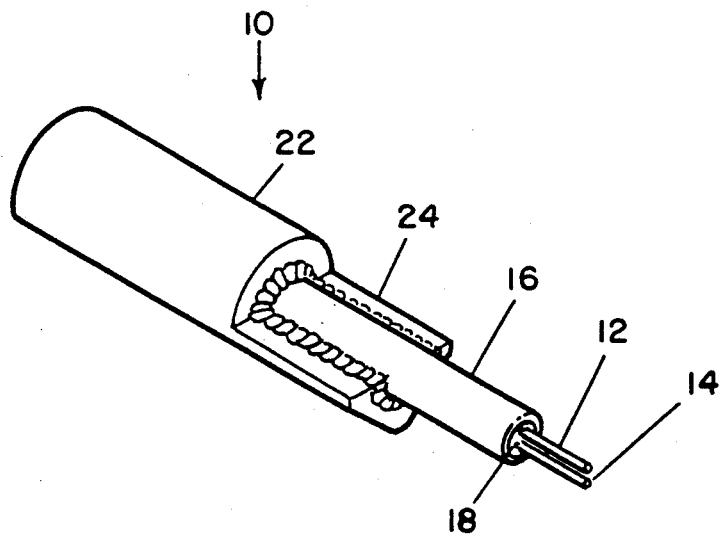
FIG. 1 is a perspective of a thermocouple connector according to the invention.
Figure 2:
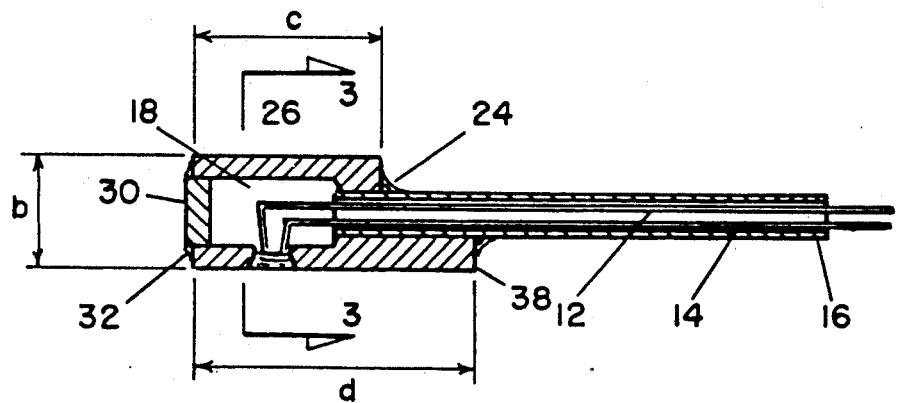
FIG. 2 is a longitudinal section through a thermocouple connector according to the invention.

Referring to the Figures, there is shown a thermocouple connector 10 having a pair of leads 12 and 14 sheathed in a cable 16 having a magnesium oxide filler 18. The cable 16 is of standard construction and may be obtained for example from Pyrotenax of Trenton, Ontario.

A casing 22 is welded to the cable 16 at 24. The casing 22 is cylindrical, made from a heat conductive and weldable material such as stainless steel, and defines a hollow interior cavity 26. An end cap 30 is welded at 32 onto the casing 22 to seal the cavity 26.

Figure 3:
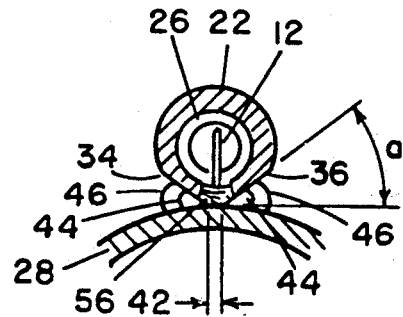
FIG. 3 is a cross section along the line 3—3 in FIG. 2.

As shown in FIGS. 1 and 3, the casing includes a linear ridge 38 defined by two inclined faces 34 and 36, shown here at an angle of 115 degrees to each other (the angle a shown is 37.5 degrees). The angle between the faces 34 and 36 is preferably between 90 and 135 degrees, and is such that the casing 22 may be welded to a pipe surface 28 with the apex of the liner ridge 38 in contact with the pipe surface (the flat apex of the casing is referred to here as the surface contact zone). The casing 22 is preferably welded to the pipe surface with two weld passes, resulting in the two welds 44 and 46 shown in FIG. 3. The contact zone 42, which consists of the flat surface of the linear apex of the linear ridge 38, is preferably sufficiently wide to facilitate a full penetration weld but not so wide that the contact zone 42 lifts off the pipe surface, and in the embodiment shown is 0.0625" wide. The dimensions b, c and d of the casing shown are 0.63", 1.00" and 1.50" respectively. The selection of the length c of the casing minimizes the heat sink effect, while limiting the mass of the casing 22 to the minimum desirable to shield the thermocouple junction from radiation and while maintaining the ruggedness of the casing.

The leads 12 and 14 are co-linear with the contact zone 42 and extend into the hollow interior 26 of the casing 22. Conceivably the linear ridge might be at right angles to the cable 16, but this is not preferred. The attachment of the leads 12 and 14 to the casing 22 and therefore the ends of the leads near their junction should be co-linear with the contact zone so that each of the leads is as close as possible to the centre of the linear ridge. The junction of the leads 12 and 14 is welded at 56 into the base of the casing 22. This design minimizes interference with the junction from the welds 44 and 46. The hollow interior 26 of the casing 22 is preferably filled with magnesium oxide 18 or other appropriate insulating material.

The welds 44 and 46 should penetrate the casing 22 sufficiently to melt the steel in the linear ridge at the contact zone 42 so that there is continuous metal between the pipe surface and the leads 12 and 14. If the leads 12 and 14 are oriented away from the apex of the ridge (away from the contact zone 42), such as would occur if the leads defined a plane at right angles to the ridge, then there is a risk that one of the welds might melt one of the leads, and render the thermocouple junction inaccurate.

In this manner, the contact zone is sufficiently wide in relation to the distance of the contact zone from the leads such that welds along the side of the contact zone penetrate the contact zone, but do not penetrate so far as to burn the leads.

A person skilled in the art could make immaterial modifications to the invention described and claimed in this patent without departing from the essence of the invention.

I claim:

1. A thermocouple connector for measuring the temperature of a surface, the thermocouple connector comprising:

a heat conductive casing having a hollow interior and a first side for contact with the surface and a second side opposed to the first side, away from the surface;

insulating material within the hollow interior;

a cable having a pair of thermocouple leads extending from the cable into the hollow interior of the casing at a first end of the casing;

the casing having a linear ridge including a surface contact zone formed on the first side and having a portion on the second, opposed side having a greater diameter than the cable;

the surface contact zone extending at the first end of the casing further along the cable than the portion on the second, opposed side;

the thermocouple leads being attached to the casing at the linear ridge; and the contact zone being sufficiently wide in relation to the distance of the contact zone from the leads such that welds along the side of the contact zone penetrate the contact zone, but do not penetrate so far as to burn the leads.

2. The thermocouple connector of claim 1 in which the hollow interior of the casing is sealed at a second end of the casing opposed to the first end by a cap welded onto the casing.

* * * * *